(12) United States Patent
Bowen et al.

(10) Patent No.: US 6,580,710 B1
(45) Date of Patent: Jun. 17, 2003

(54) METHOD AND APPARATUS FOR FACILITATING INTRA-PREMISES VOICE AND DATA DISTRIBUTION USING EXISTING IN-PLACE POTS TELEPHONE LINES

(75) Inventors: Donald John Bowen, Madison, NJ (US); Richard Henry Erving, Piscataway, NJ (US); Robert Raymond Miller, II, Morris Township, Morris County, NJ (US); John F. Murray, Denville, NJ (US); Christopher W. Rice, Parsippany, NJ (US); Jesse Eugene Russell, Piscataway, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/444,183

(22) Filed: Nov. 19, 1999

(51) Int. Cl.[7] ............................................... H04L 12/66
(52) U.S. Cl. ....................... 370/353; 370/380; 370/360; 379/413.03
(58) Field of Search .................. 370/352, 353, 370/354, 357–60, 386, 389, 400–402, 431, 445, 480, 482, 489, 490, 493, 496; 379/90.01, 142.18, 250, 399.01, 413.02, 413.03, 449

(56) References Cited

U.S. PATENT DOCUMENTS 6,259,708 B1 * 7/2001 Cheng et al. ................ 370/493
6,345,071 B1 * 2/2002 Hamdi ........................ 375/222
6,427,237 B1 * 7/2002 Aranguren et al. ......... 725/106

* cited by examiner

Primary Examiner—David Vincent

(57) ABSTRACT

Broadband services are provided to customer premises, whose existing premise wiring does not have broadband capability, by disaggregating the various signals, including broadband services, supplied to the premise from a broadband communication link at the customer premise's edge, so that the existing POTS wires, within the customer premises, may function as separate channels for varied broadband and narrow band services. Intra premises broad band services are disaggregated so that POTS service responds normally to the network while internal LAN networks operate independently of the outside system network.

8 Claims, 3 Drawing Sheets

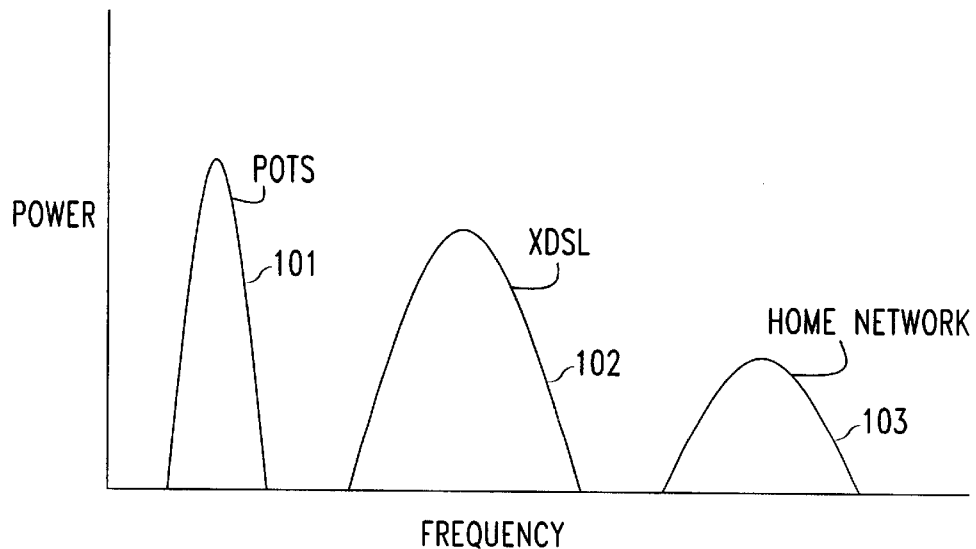
FIG. 1 *(PRIOR ART)*
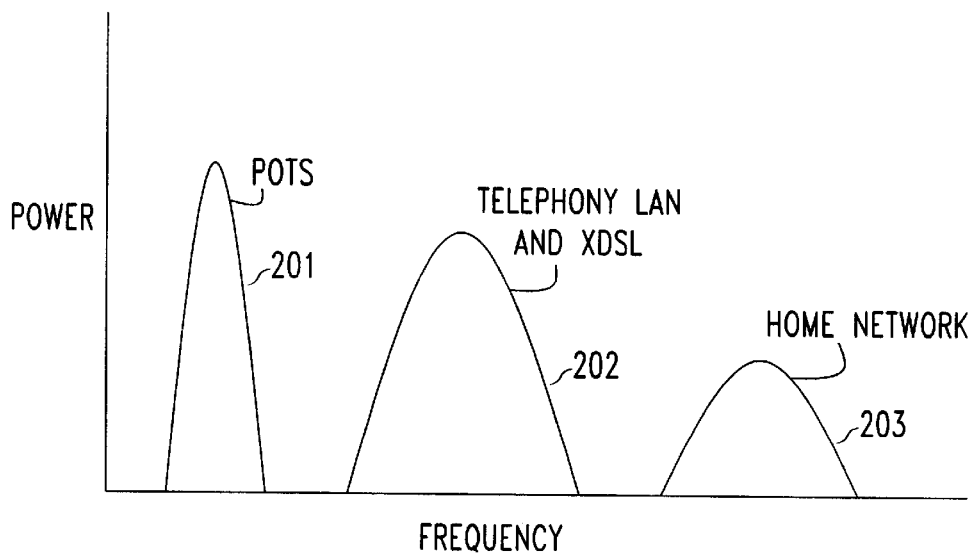
FIG. 2

METHOD AND APPARATUS FOR FACILITATING INTRA-PREMISES VOICE AND DATA DISTRIBUTION USING EXISTING IN-PLACE POTS TELEPHONE LINES

FIELD OF THE INVENTION

This invention relates to voice and data distribution within a customer premise and in particular to achieving such distribution using in-place POTS telephone lines. It is further concerned with combining such intra-premise distribution with broadband service delivery to the customer premise. It also concerns independent broadband services confined within the customer premise, which utilize the existing in-place POTS telephone lines for in-home networking.

BACKGROUND OF THE INVENTION

Telephone service has evolved from the traditional voice service of POTS (Plain Old Telephone Service) to a communication service providing voice communication, data transfer and communication and a host of many other services provided over a wideband communication link/channel. That link is no longer the traditional narrowband channel of POTS. What has evolved in its place is a wideband communication channel providing services requiring a wideband communication channel.

There are various schemes to bring wideband services from a communication network over a wideband channel to the customer premise. Use of in-home power lines and installation of special cabling for data transmission have been suggested but are not readily feasible due to cost or transmission clarity or both. An alternate scheme is concerned with using the existing customer premise in-place wiring which is typically twisted pair commonly used in POTS. There are several companies and associations that have been formed to deal with this state of affairs. One such association is The Home Phoneline Networking Alliance (HomePNA) formed to promote high speed Ethernet technology for within the home (i.e., customer premise) high-speed connections. Development of specifications for interoperability of home-networked devices using already in-place POTS wiring is one of their objectives. Their position, in this matter, is described in a white paper entitled "The Home Phoneline Networking Alliance" and dated June 1998. It is available at http://www.homepna.org. In that document the interoperability of multiple PCs and networking of devices for sharing simultaneous Internet access, PC peripheral sharing and file/application network sharing is discussed. In brief both normal telephony and networking must occupy and work over the same telephone lines simultaneously.

Spectral compatibility, between various services occupying different bandwidths, over common phone lines may be achieved by Frequency Division Multiplexing with each service being assigned a service band different from frequency bands used by other services. Interference between services may be handled by application of filtering techniques. In a suggested embodiment separation of different service types is achieved by the establishment of frequency ranges; Standard voice occupies a range of 20 Hz to 3.4 kHz, xDSL services occupy a frequency range of between 25 kHz to 1.1 MHz and phoneline networking operates in a range above 2 MHz. This division of frequencies is illustrated in the FIG. 1 graph.

The integrity of the high-speed data throughput transmitted over the phone lines is accomplished by encoding. One coding implementation—Time Modulation Line Coding—to insure integrity has been developed by Tut Systems, Inc (Tut). In this method each receiver has the ability to adapt to its local noise environment. All devices connected to the network continuously monitor line conditions and adjust to the existing conditions. The Tut system also incorporates access and collision detection as defined by the standard IEEE 802.3 CSMA/CD (Carrier Sense multiple Access/Collision Detect).

A home gateway is used if a home is serviced by more than one access network such as a mix of cable, DSL, satellite and POTS. Various gateways for this purpose have been proposed by a plurality of telephone equipment manufacturers.

The systems so far described do not disclose dealing with the existence and creation of multiple phone extensions in the customer premise. The method of disaggregating the broadband signals delivered to the customer premise must also be considered.

SUMMARY OF THE INVENTION

Broadband services are provided to customer premises, whose existing premise wiring does not have broadband capability, by disaggregating the various signals, including broadband services, supplied to the premise from a broadband communication link at the customer premise's edge, so that the existing POTS wires, within the customer premises, may function as separate channels for varied broadband and narrow band services. Intra premises broad band services are disaggregated so that POTS service responds normally to the network while internal LAN networks operate independently of the outside system network.

A particular embodiment allows one pair of twisted telephone wires to provide accommodation for three separate co-channels of communication covering POTS, xDSL (i.e., telephony LAN) and home data networking. The broadband frequency spectrum at the edge is divided into three frequency bands for intra-premise distribution. The first frequency band covers a frequency range to about 40 kHz, which is comparable to POTS. A second frequency band covers a range of 100 kHz to 1.1 MHz, which may be used for LAN service. A third frequency range covers a range of 2 MHz to 30 MHz for providing high speed data service.

Customer premise distribution is achieved by using a Broadband Communications Interface (BCI) which disaggregates the incoming signals from the incoming broadband signal. In the disclosed embodiment it accepts wireless, cable fiber and twisted pair and distributes them to customer premise power lines, indoor wireless systems and in-place phone lines.

In addition to the basic POTS phone line added telephone lines may be added to the intra-network. A Network Interface Device (NID) connects each CPE (Customer Premises Equipment) device to the telephony LAN (i.e., in-place POTS lines-twisted pair). Each NID allows the user of the connected device to select a new telephone line (i.e., a new directory number) and have it automatically provisioned. The NID registers this request with the BCI, which in turn requests the new phone line from the network.

Lifeline support for the POTS line is provided so that all phone lines are provided with ringing. The telephony LAN NID provides the ringing in common for all lines, by providing a low power ringer, to avoid overloading the network backup power.

In another embodiment multi-line voice and data service are combined into one frequency band. Protocols are used to manage contention issues in such use.

BRIEF DESCRIPTION OF THE DRAWING

FIG. 1 is a graph of frequency distributions for a home communication system in accord with HomePNA specifications;

FIG. 2 is a graph of frequency distributions for a home communication system;

DETAILED DESCRIPTION

Figure 3:
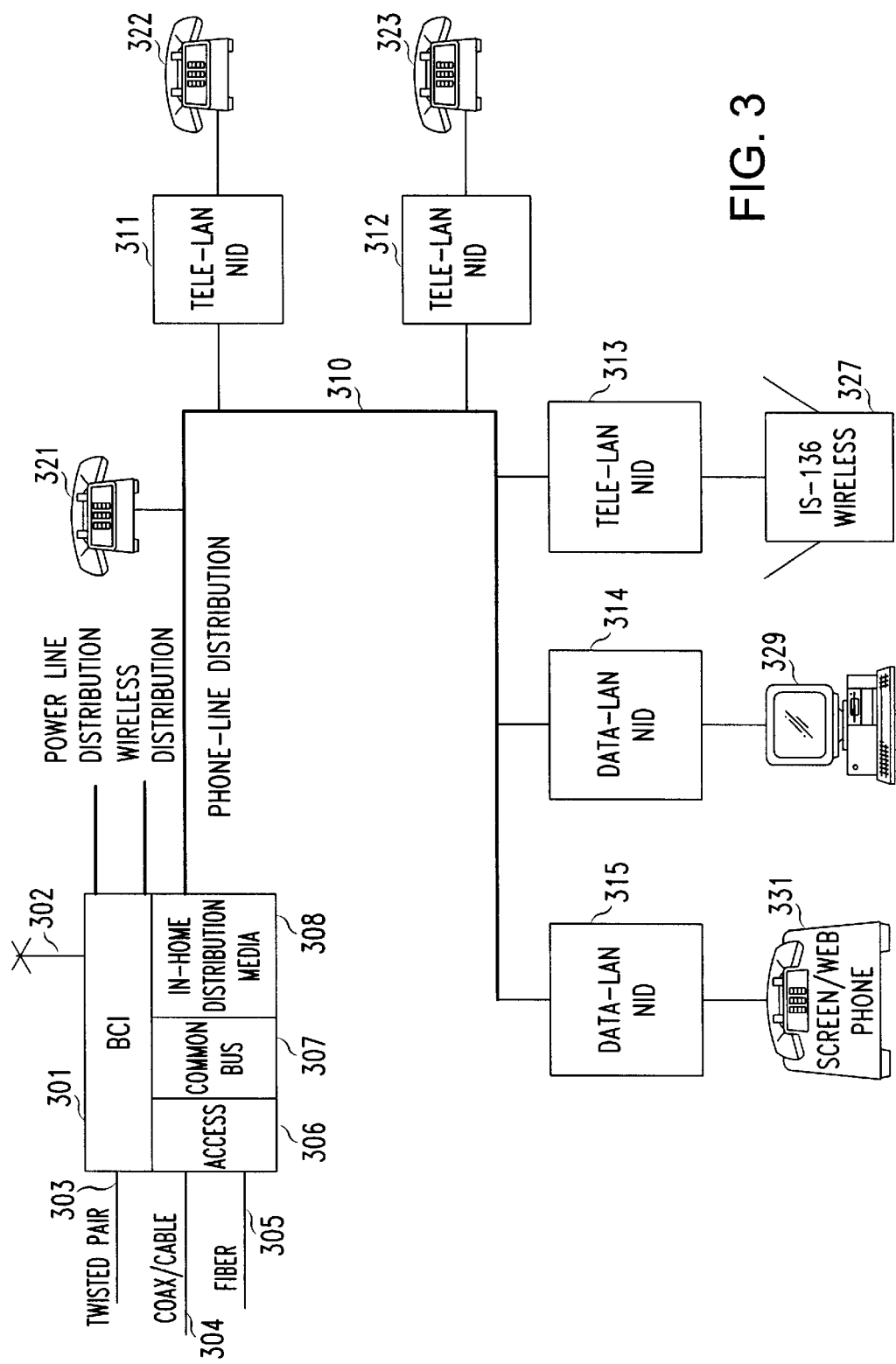
FIG. 3 is block diagrams of an in-home communication including a LAN using in-place POTS wiring.

In the frequency band distribution illustrated in FIG. 1 a single twisted pair transmits three channels in an in-home or in-premise LAN wire for 1) providing POTS telephone service (curve 101), 2) providing xDSL connected Internet access (curve 102) and 3) providing for an in-home/in-premise network (curve 103). This is in accord with HomePNA investigations. The first band of curve 101 occupies 20 Hz to 3.4 kHz. Band of curve 102 covers xDSL over a range of 25 kHz to 1.1 MHz. the home networking band of curve 103 covers above 2 MHz. These bands however do not provide for multiple telephony service within the in-home/premise in-place wiring.

Providing for telephony LAN within the home/premise may be achieved by a frequency band distribution such as shown in the FIG. 2 graph. The first frequency band shown by curve 201 is devoted to the POTS band. The band shown by curve 202 is, in contrast to the corresponding band of FIG. 1, devoted to an in-home telephony LAN. The final curve 203 is devoted to the home data network. In the illustrative embodiment the first band of curve 201 extends to about 40 kHz. Curve 202 covers a range of 100 kHz to 1.1 MHz. the data networking range of curve 203 encompasses a frequency band of 2 MHz to 30 MHz.

In the schematic of FIG. 3 four types of network service are shown as being connected to a Broadband Communication Interface (BCI) 301. These include a wireless input 302, twisted pair input 303, a coaxial cable input 304 and a fiber input 305. These varied inputs are included in the schematic to indicate the versatility of the BCI. Such versatility is not needed to practice the invention; indeed the full value of the in-home system may be realized with a twisted pair input only.

The BCI 301 comprises either a stand-alone gateway or a PC programmed to provide gateway functions. An access specific interface 306 is connected to the inputs and is specific to one type of input, which in the embodiment disclosed is twisted pair although an access specific interface may be used for wireless, cable or fiber. The received signals are connected to a common bus 307 to which the in-home distribution links/channels 308 are connected. This in-home distribution link 308 forming the LAN cabling 310 may comprise the existing in-home POTS phone line wiring. Other in-home LAN distribution may be through the in-home AC power lines 311 or may be connected by an in-home wireless distribution 312.

A plurality of CPE (Customer Premise Equipment) is connected to the LAN cable 310 via NID (Network Interface Device) circuits 311–315 and includes Tele-LAN NID circuits 311, 312 and 313. Two data LAN circuits 314 and 315 complete the illustrative embodiment shown.

The NID and BCI devices work in combination to provide multiple services to various CPE devices connected to the in-home LAN twisted pair cabling. These devices control specific communication functions of the first three layered protocols (i.e., physical, MAC and Network layers) of the received signals/services from the outside network. These may arrive by many conduits (i.e., twisted pair, cable, etc.), but in each case the signal is processed (i.e., including appropriate modulation to each service in each layer) through the three layers by the BCI and NID units to the end CPE devices. Modulation in the BCI tends to be a common modulation process and is more specific to the service/CPE device in the appropriate NID. Service independent functions such as initial modulation and synchronization are performed in common in the BCI. More service specific functions are performed at the network level in the NID device, also designated as Tele-LANs.

A first telephone 321 is shown connected directly to the phone line distribution wire 310 or telephone LAN cable 310 and is considered to provide the basic POTS. Second and third telephones 322 and 323 are attached to NIDs 311 and 312 to the phone line distribution cable 310. An in-building wireless station 327 (i.e., for example one conforming to IS-136 standards) is connected to Tele-LAN or NID 313 coupling it to the cable 310.

A data-LAN (NID) 314 couples a computer 329 to the cable 310 and another data-LAN 315 (NID) couples a screen/Web phone (IP telephony) 331 to the cable 310. The NIDs all communicate with the BCI for the purpose of passing user requests to the public communication network via the BCI.

Secondary, tertiary and quaternary telephone line requests (i.e., for new phone lines__new DN) are registered with the BCI and the BCI in turn conveys this request to the public communication network. The new phone line is automatically provisioned under control of software included in the BCI. Requests for extensions on the LAN of an existing phone line may also be handled in a similar manner. These requests, however, are handled internally, independently of network intervention. Each NID permits each CPE devoted to voice telephony to voluntarily switch to a new secondary voice telephone line by switching processes within the NID and by registering the request in the BCI. The BCI, in turn, transfers the request to the public communication network for provisioning of the new line.

In the event of a power failure all the phones connected to in-home POTS line naturally revert to being powered by power supplied by the public communication network. Since the action of ringing all POTS phones connected to the LAN would overload the available ringing power all the NIDs have included, as an integral part thereof, a very low power alerting device to respond to network transmitted alerts, which prevents a ringing power overload.

The NIDs used for data devices (Tele-data) use known data transmission standards such as Ethernet protocols or other similar protocols.

Figure 4:
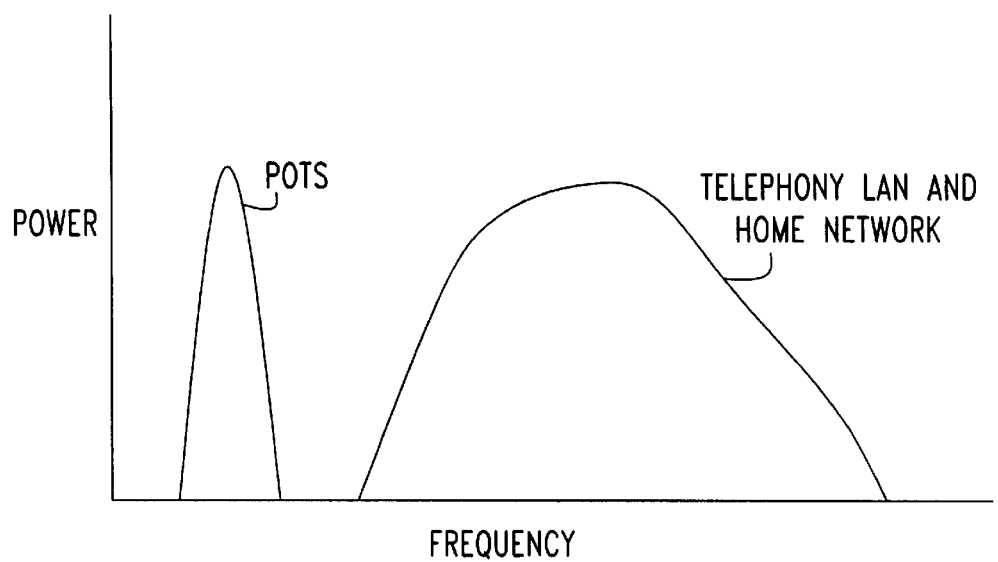
FIG. 4 is a graph of an alternative frequency distribution for a home communication system.

Many variations of the invention will suggest themselves to those skilled in the art without departing from the spirit and scope of the invention. In one variation the voice LAN and data LAN could be combined into one frequency band using a protocol suitable for both services. Such a frequency distribution is illustrated in FIG. 4.

What is claimed is:

1. A method of providing broadband services, supplied by a broadband network, within a customer premise over existing in-place POTS telephony wiring normally providing only narrowband services, comprising the steps of:

dividing a frequency spectrum providing various services to the customer premise into three distinct bands; including:
  dedicating a first band of frequency to narrowband telephony providing primary voice service;
  dedicating a second band of frequency to in-premise local area network service, and also to secondary voice service; and
  dedicating a third band of frequency to high speed data service; and
accepting all incoming varied telephone signals at the customer premise with a Broadband Communications Interface (BCI) that disaggregates the incoming signals into the varied services defined by the three distinct bands and coupling the incoming signals to the in-place POTS telephony wiring;
connecting all CPE equipment including telephones to the in-place POTS telephony wiring through a Network Interface Device (NID);
permitting each CPE devoted to voice telephony to voluntarily switch to a new secondary voice telephone line by switching processes within the NID and registering the request in the BCI, which in turn transfers the request to the network for provisioning; and
providing the secondary voice telephone line within the second band of frequency.

2. The method of claim 1, further including a step of:
providing low power alerting responsive to lifeline power provided by a public communication network for alerting all within customer in-premise POTS telephones of incoming calls.

3. The method of claim 1, wherein the step of dividing the frequency spectrum includes:
bracketing the first band within 1 to 40 kHz.

4. The method of claim 1, wherein the step of dividing the frequency spectrum includes:
bracketing the second band within 100 kHz to 1.1 MHz.

5. The method of claim 1, wherein the step of dividing the frequency spectrum includes:
bracketing the third band within 2 MHz to 30 MHz.

6. A method of providing broadband services, supplied by a public broadband network, within a customer premise over existing in-place POTS telephony wiring normally providing only narrow band services, comprising the steps of:
dividing a frequency spectrum providing various services to the customer premise into two distinct bands; including:
  dedicating a first band of frequency to narrowband telephony providing primary voice service;
  dedicating a second band of frequency to in-premise local area network service, secondary voice service and high speed data service;
accepting all incoming varied telephone signals at the customer premise with a Broadband Communications Interface (BCI) that disaggregates the incoming signals into the varied services defined by the two distinct bands and coupling the incoming signals to the in-place POTS telephony wiring;
controlling signals in the second band of frequency with signal exchange protocol controls applicable in all applications;
connecting all CPE equipment including telephones to the in-place POTS telephony wiring through a Network Interface Device (NID);
permitting each CPE devoted to voice telephony to voluntarily switch to a new secondary voice telephone line by switching processes within the NID and registering the request in the BCI, which in turn transfers the request to the network for provisioning; and
providing the secondary voice telephone line within the second band of frequency.

7. The method of claim 6, further including a step of:
providing low power alerting responsive to lifeline power provided by a public communication network for alerting all within customer in-premise POTS telephones of incoming calls.

8. An in-premise network for accepting multi-band services and distributing them in-premise using in-place narrowband POTS wire-lines; comprising:
a Broadband Communications Interface (BCI) connected for accepting all incoming varied telephone signals at the customer premise and desegregating the incoming signals into varied services defined by three distinct frequency bands and coupling the incoming signals to the in-place POTS telephony wiring; with the first frequency band providing narrowband POTS telephony, the second frequency band providing local area network service and the third frequency band providing high speed data service;
Network Interface Devices (NID) connecting all CPE equipment including telephones to the in-place POTS telephony wiring; each NID providing processing in combination with the BCI for provisioning new telephone lines; with a first telephone served as a POTS telephone in the first frequency band and secondary telephones serviced within the second frequency band.

* * * * *